United States Patent Office 3,522,527
Patented Aug. 4, 1970

3,522,527
METHOD AND APPARATUS FOR MEASURING MATERIAL THICKNESS
Royson V. Williams, Staines, and Brian L. Dalton, London, England, assignors to The British Iron and Steel Research Association, London, England
Filed Sept. 13, 1967, Ser. No. 667,522
Int. Cl. G01r 27/04
U.S. Cl. 324—58.5                                  11 Claims

ABSTRACT OF THE DISCLOSURE

A method and apparatus for measuring the thickness of objects such as rolled steel from a plate mill. A pair of cavity resonators are disposed closely adjacent each side of the object. Each resonator has applied thereto a swept frequency microwave signal. The instant at which each resonator resonates is detected by respective detectors, sensitive either to the amplitude of the signal from the resonator or to the phase change of the resonator signal at resonance. The microwave frequency at the respective resonant instants is determined. The thickness may then be calculated from the two determined frequencies and from the known distance apart of the resonators, since the resonant frequencies are related to the distance between each cavity and the nearer face of the object.

BACKGROUND OF THE INVENTION

This invention relates to a method and apparatus for measuring the thickness of an object or section without the use of elements which are in actual contact with the object or section to be measured.

There are numerous instances in industry in which it is required to measure the thickness of an object or section and where, on account of the speed of movement of the section or its temperature, physical contact cannot be made with the object or section for the purpose of measuring its thickness. For example, the rolled material coming from a plate mill travels at a considerable speed and the thickness of the rolled section must be accurately measured without the necessity for stopping it. It has been found impossible to devise a contact arrangement which has sufficiently rapid resolution to measure the thickness accurately. In particular, it has been found impossible to devise apparatus which will remain firmly in contact with the moving section to enable accurate measurement to be made. In the case of a plate or sheet rolling process the sheet leaving the rolls in a horizontal direction may to some extent move up and down in the course of its forward travel and this increases the difficulty in measurement by contact since both the contact points with which the measurement is to be made must be movable. Where high speed does not provide an obstacle to accurate measurement, the temperature of the object may be too high. In other instances, for example, in the rolling of softer materials such as brass, the softness of the material may preclude any measurement which requires firm contact. This also applies where the thickness of comparatively soft nonmetallic materials, such as paper, is being measured.

Attempts have been made to use a form of radiation for the measurement so that mechanical contact is unnecessary. Certain radiation gauges are known in which use is made of X-rays, Y-rays or $\beta$-rays in an absorption method by which the amount of the rays absorbed in passing through the material gives an indication of thickness. However, in these methods the amount of radiation becomes a hazard to health and elaborate safety precautions have to be taken when making use of them.

There is consequently a requirement for a method which can be used to measure accurately the thickness of sections which are travelling at high speed or which are at elevated temperatures, or both, which does not involve contact measurement and make use of a form of radiation which is not harmful either to the operator or to the material of which the section to be measured is made.

The object of the present invention is to provide a method and apparatus which enable material thickness measurement to be carried out with accuracy on an object or a section which may be travelling at high speed and/or may be at high temperature and whose thickness may be less than $\frac{1}{10}$ of an inch.

According to this invention there is provided a method of measuring the thickness of an object or section comprising the steps of applying a microwave beam whose frequency is repeatedly swept over a predetermined range to a pair of cavity resonators disposed one at each side of the object, detecting the instant at which each resonator resonates, determining the frequency at which each resonance occurs, and calculating the thickness of the object from the determined resonant frequencies and the known distance between the two resonators.

The resonant frequencies are preferably determined in either of two ways. Firstly the amplitude of the detected signals from the cavities may each be monitored by a voltage level detector which is set to trigger at a predetermined level, suitable 3 db on the Q curve. Alternatively the phase change of the detected signals from the cavities at the resonant frequency may be monitored.

According to the invention there is also provided apparatus for carrying out the above method comprising a microwave generator, a sweep frequency modulator connected to sweep the generator frequency over a predetermined range, a pair of cavity resonators to each of which the swept frequency microwave signal is applied and between which the object whose thickness it is desired to measure is disposed, a detector for each resonator to detect the instant at which it resonates, means for determining the frequency at which each resonance occurs, and means for calculating the thickness of the object from the determined resonant frequencies and the known distance between the two resonators.

Three embodiments of the invention will now be described, by way of example only, with reference to the accompanying drawings, in which.

Figure 1:
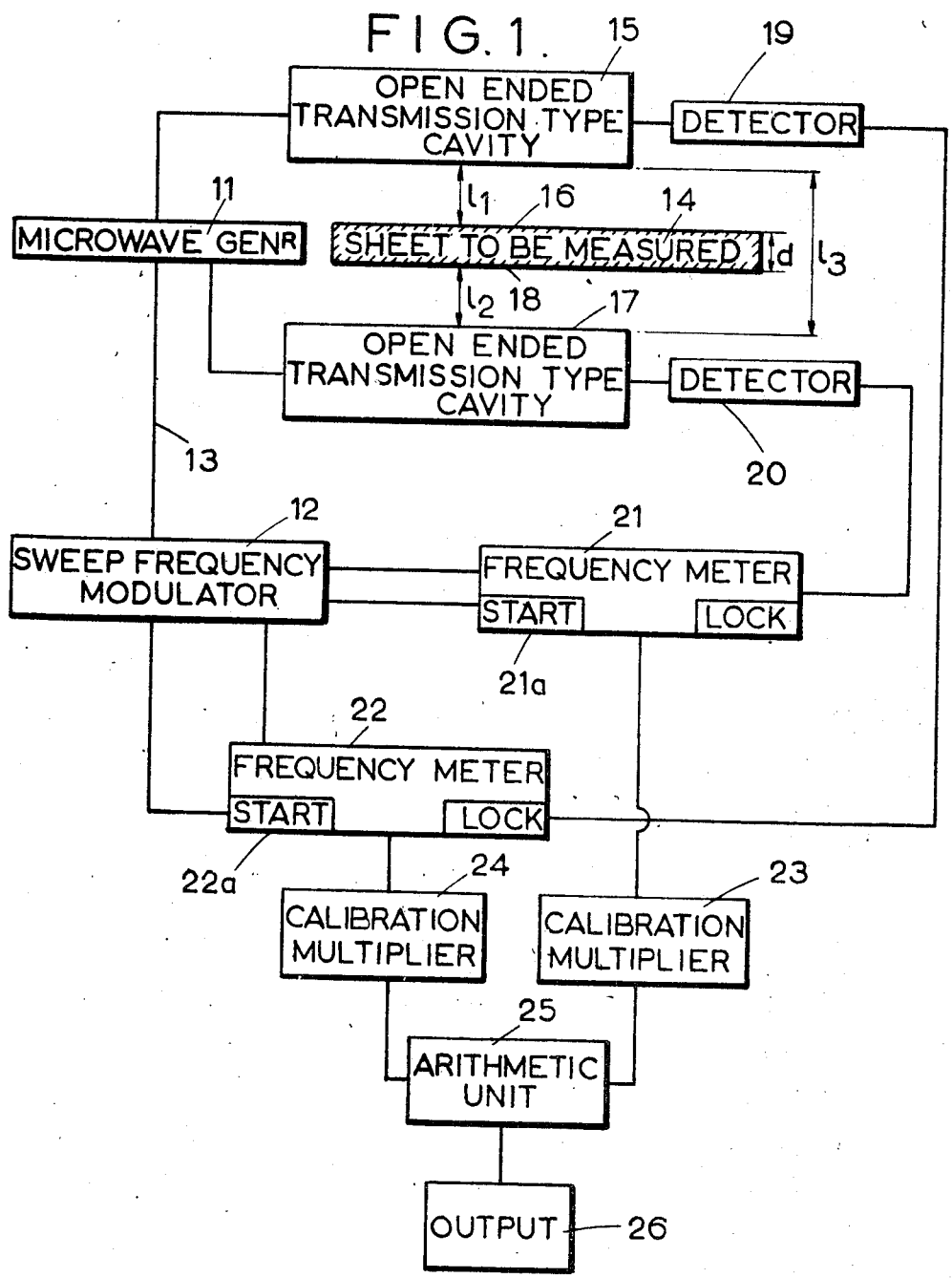
FIG. 1 illustrates one form of apparatus according to the invention in block schematic form.

Referring to FIG. 1 there is shown one form of apparatus in block schematic simplified form for the purpose of explaining the principle of operation. In FIG. 1 theer is shown a microwave generator 11, which is arranged to generate oscillations at a frequency in the region of $10^{10}$ clycles per second or 10 giga cycles per second. A sweep frequency modulator 12, which is suitably arranged to have a frequency range of 100 mc./s. per second, is connected through a line 13 to the generator 11 in order to frequency-modulate the output of the generator 11 so that it sweeps over the predetermined range. The moving object or section to be measured is represented by the block 14 and has disposed adjacent each of its two side faces an open-ended transmission type cavity, the cavity 15 being adjacent the surface 16 of the section 14 and the cavity 17 being adjacent the surface 18 of the section 14. The cavity 15 will resonate at a frequency dependent upon its distance from the surface 16, the distance being designated by the symbol $l_1$, and the cavity 17 will resonate at a frequency which depends upon its distance from the surface 18, this distance being designated $l_2$ in FIG. 1.

The total distance between the open ends of the cavities 15 and 18 is designated $l_3$ in FIG. 1 and the thickness of the section is designated $d$ so that $l_1+d+l_2=l_3$.

The modulated output of the microwave generator 11 is applied both to the cavity 15 and to the cavity 17. During each sweep of the frequency, due to the modulator 12, the microwave beam will pass through the frequency at which each of the cavities resonates. The instant at which the cavity 15 resonates is detected by a detector 19 and the instant at which the cavity 17 resonates is detected by a second detector 20.

The output of the sweep frequency modulator 12 is supplied to the counting portion of a frequency meter 21 and also to a "start" connection 21a of that meter, and to the counting portion of a second frequency meter 22 and to the "start" portion 22a of that meter. In operation the frequency meters are started at the start of a sweep of the modulator 12 and the number of cycles which each produces is monitored. The instant at which cavity 17 resonates is detected by the detector 20, which produces an output pulse and this pulse is applied to the frequency meter 21 to lock its count, i.e., to stop the meter and retain its count on record. In the same way, the frequency meter 22 monitors the cycles in the output of the frequency modulator 12 from the start of a sweep until its count is locked by an output pulse from the detector 19, which occurs when the cavity 15 resonates. Since the initial parameters are known it is possible to establish the thickness $d$ from the counts of the frequency meters 21 and 22. However the thickness is not directly related to the frequency counts of the meters 21 and 22, and the output of the frequency meter 21 is applied to a calibration multiplier 23 and the output of the frequency meter 22 is applied to a similar calibration multiplier 24. The calibration multipliers are devices which compensate for the non-linearity of the frequency counts in relation to the thickness of the section 14. Their outputs are applied to an arithmetic calculating unit 25 which calculates the thickness $d$ and provides a signal to an output unit 26 which indicates the thickness $d$ directly.

It will be observed that if the section 14 remains at a constant thickness but moves up and down (that is towards and away from the two cavity resonators 15 and 17) the distance $l_1$ will increase as the distance $l_2$ decreases by an equal amount, and vice versa. This, of course affects the frequency at which each cavity resonates, but the effect of this variation is automatically eliminated by the arithmetic unit 25 which effectively subtracts the distances $l_1$ and $l_2$ (whatever they are) from the distance $l_3$ to arrive at a true measure of the distance $d$.

Figure 2:
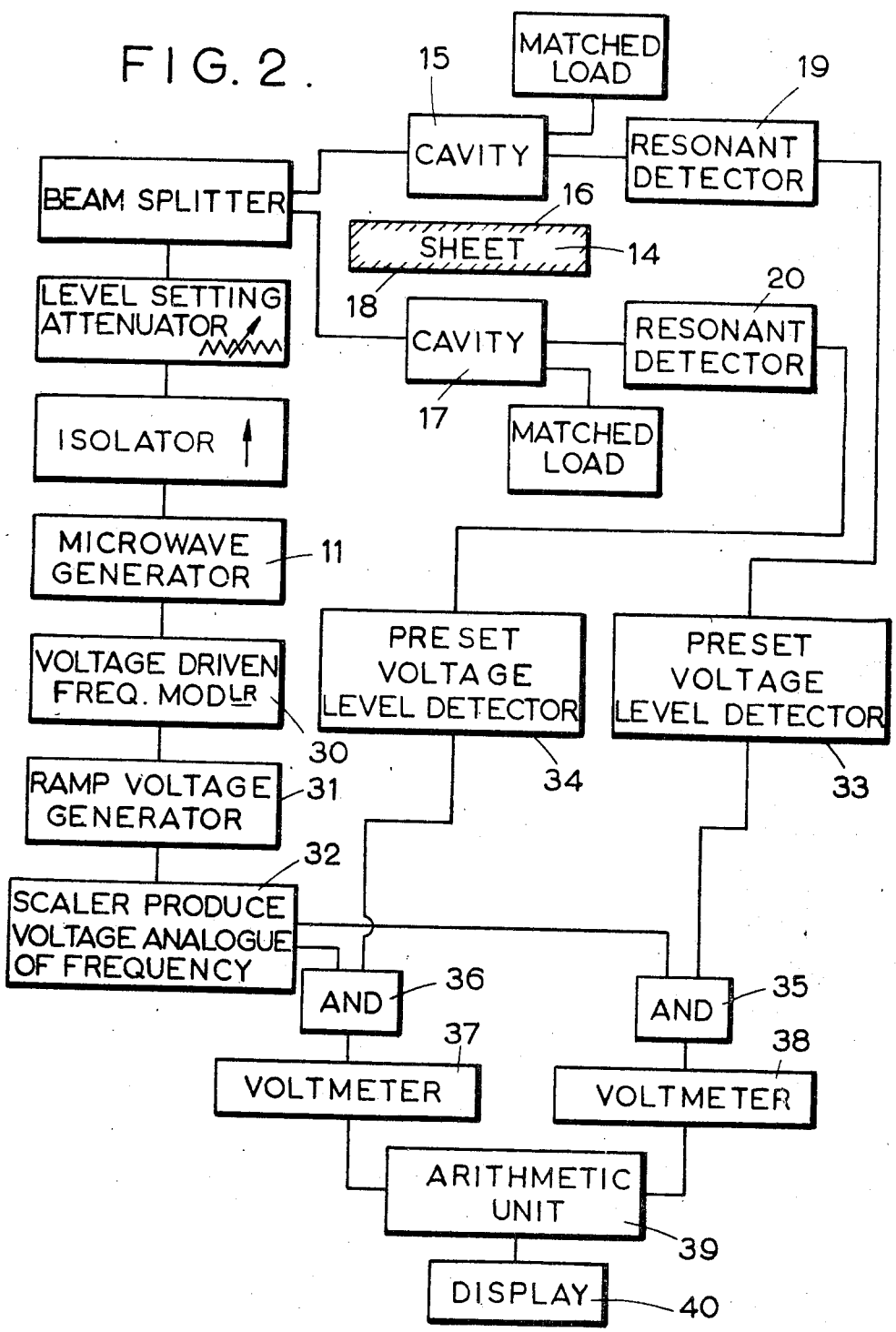
FIG. 2 illustrates a second form of the apparatus.

Referring now to FIG. 2, there is shown a second form of the apparatus which functions on a similar basic principle as explained above with reference to FIG. 1. Similar parts are identified by similar reference numerals to those used in FIG. 1. In FIG. 2, the microwave generator 11 has its output signal frequency swept through the predetermined range by means of a voltage driven frequency modulator 30 which is controlled by a ramp voltage generator 31. The ramp voltage generator also supplies a signal to a scaler 32 which produces an output signal embodying a voltage analogue of the instantaneous frequency of the output of the sweep frequency modulator 30.

In operation, as cavity 15 approaches resonance, the output signal from the resonant detector 19 increases rapidly, according to the very sharp Q curve of the cavity detector system. The 3 db level of the Q is detected by a voltage level detector 33, which is preset to trigger at the 3 db level and thereupon to generate an output signal. The resonance of cavity 17 is similarly detected by resonance detector 20 and the 3 db level detected by level detector 34. The outputs of level detectors 33 and 34 are connected to form first inputs to two AND gates 35 and 36. Two output lines for scaler 32 are connected to form the second inputs of the two AND gates.

It will be seen that the occurrence of a signal at the first input (from level detector 33) to AND gate 35 indicates the instant at which cavity 15 resonates, and the signal present at that instant at the second input (from scaler 32) to AND gate 35 indicates the frequency at which the resonance occurs. The level of the outputs of the AND gates 35 and 36 are measured by voltmeters 37 and 38 and the outputs of the voltmeters connected to arithmetic unit 39, which in turn supplies a suitable display system or meter 40. Arithmetic unit 39 functions in a similar manner to the unit 25 described above with reference to FIG. 1, to calculate the thickness of the object or section.

Figure 3:
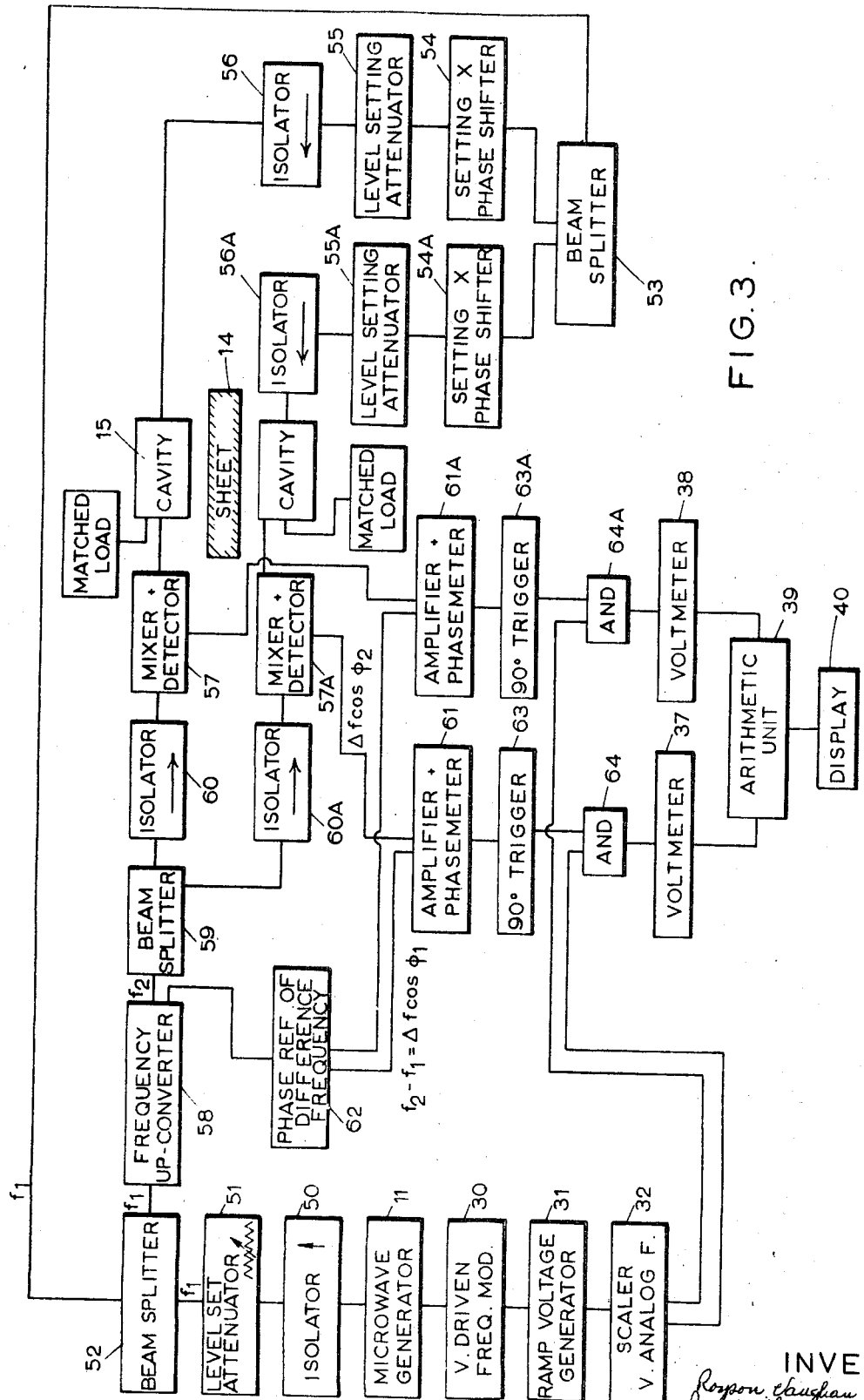
FIG. 3 illustrates a third form of the apparatus.

Referring now to FIG. 3 there is shown a third form of the apparatus. Similar parts are identified by similar reference numerals to those used in FIGS. 1 and 2. In FIG. 3, the swept frequency signal from the microwave generator is passed through an isolator 50 and a level setting attenuator 51 to a first beam splitter 52. One output of the splitter 52 is connected to a second beam splitter 53, the two output channels of which each include a setting phase shifter 54 and 54A, and a level setting attenuator 55 and 55A and an isolator 56 and 56A. The isolators 56 and 56A are connected respectively to the two cavities 15 and 17.

The outputs of the cavities 15 and 17 are connected to form the first inputs to combined mixer and detector units 57 and 57A. The second inputs to detectors 57 and 57A are derived from the second output of the first beam splitter 52, which is connected through a frequency up-converter 58, a third beam splitter 59 and two parallel isolators 60 and 60A, the outputs of which form second inputs to detectors 57 and 5A. The outputs of the detectors 57 and 57A are connected as first inputs to two amplifiers and phase meter units 61 and 61A, and the second inputs to units 61 and 61A are derived from a second output of the frequency up-converter 58 connected through a unit 62 which provides a signal indicative of the phase relation between the frequency of the input of the up-converter 58 and the frequency of the output of the up-converter 58.

The outputs of the phase meters 61 and 61A are connected through 90° phase sensitive trigger circuits 63 and 63A to form first inputs to two AND gates 64 and 64A. Two output lines from scaler 32 are connected to form the second inputs of the two AND gates.

The level of the outputs of the AND gates are measured by voltmeters 37 and 38 and the outputs of voltmeters connected to an arithmetic unit 39, which in turn supplies a suitable display system or meter 40. The arithmetic unit 39 functions in a similar manner to the unit 25 described above with reference to FIG. 1, to calculate the thickness of the object or section.

In each of the above described three embodiments the cavities are chosen to have a wide dynamic range while retaining sufficient sensitivity to distinguish ±0.0001 thousandths of an inch. A cylindrical cavity operating in the $H_{012}$ mode is conveniently used.

The microwave generator preferably embodies a backward wave oscillator, whereby to obtain a wide dynamic range over the sweep frequency range selected, which suitably corresponds to the 2.5 to 3.5 centimetre wave length range. A reflector-modulated Klystron or other oscillator may alternatively be employed.

When the cavity resonant frequencies are determined by the embodiment described with reference to FIG. 2, it is found that repeatability of measurement of thin metallic strip (about fifty thousandths of an inch thick) to about ±0.0001 inch is obtainable. When the cavity resonant frequencies are determined by the embodiment described with reference to FIG. 3, wherein the phase change at resonance is monitored, repeatability of measurement of up to ±0.00002 inch is obtainable. In each embodiment it is desirable that the cavity openings be within about half an inch of the section to be measured.

We claim:
1. A method of measuring the thickness of an object comprising the steps of generating a microwave beam, repeatedly sweeping the frequency of said beam over a predetermined frequency range, applying the swept frequency beam to each of a pair of cavity resonators disposed one at each side of the object a known distance apart, said resonators each resonating at a frequency dependent upon its respective distance from the associated side of the object, detecting the microwave signal present in each resonator, monitoring said detected signals to generate first and second resonance detected signals respectively responsive to conditions of resonance occurring in the two cavities, providing a signal representative at any instant of the sweep frequency at that instant, taking first and second measures of said representative signal in response respectively to the generation of said first and second resonance detected signals, and calculating the thickness of the object from the first and second measures of said representative signal and the known distance between the two resonators.

2. A method according to claim 1 wherein said step of monitoring said detected signal of each resonator includes the step of determining a predetermined voltage amplitude to generate the associated resonance detected signal.

3. A method according to claim 1 wherein said step of monitoring said detected signal of each resonator includes the steps of determining the phase of each detected signal and detecting the phase change which occurs at resonance to generate the associated resonance detected signal.

4. Apparatus for measuring the thickness of an object comprising a microwave frequency signal generator, a sweep frequency modulator connected to the signal generator to sweep the frequency of the microwave signal over a predetermined range, a pair of cavity resonators disposed a known distance apart and to each of which the swept frequency microwave signal is applied and between which the object whose thickness it is desired to measure is disposed, a detector associated with each resonator for detecting the microwave signal energy present in the associated resonator, means associated with each detector for monitoring a characteristic of said detected oscillatory energy to generate a trigger signal indicating the occurrence of a resonant condition in the associated cavity, means responsive to the sweep frequency generator to generate a signal representative at any instant of the sweep frequency at that instant, means responsive to the generation of each of said trigger signals to determine the value of said representative signal, and means for calculating the thickness of the object from the determined values of said representative signal and the known distance between said two resonators.

5. Apparatus according to claim 4 wherein each said monitoring means comprises a voltage level detector for triggering at a predetermined voltage amplitude to generate the associated trigger signal.

6. Apparatus according to claim 5 wherein said predetermined amplitude is substantially the 3 db level on the Q curve of the cavity system.

7. Apparatus according to claim 5 wherein there are provided two AND gates each having first and second inputs, and means for generating a signal embodying a voltage analogue of the frequency of the output of the sweep frequency modulator, said first inputs being connected to the respective outputs of the two level detectors, and said second inputs each being connected to said means for generating a voltage analogue signal, whereby at resonance each said AND gate is enabled to provide an output signal embodying a measure of the pertinent resonant frequency.

8. Apparatus according to claim 4 wherein each of said monitoring means comprises means for monitoring the phase of the detected signal and for generating said trigger signal upon sensing that the phase of the detected signal has changed at resonance.

9. Apparatus according to claim 8 wherein there are provided two AND gates each having first and second inputs, and means for generating a signal embodying a voltage analogue of the frequency of the output of the sweep frequency modulator, said first input being connected to receive the respective said output signals, and the second said inputs each being connected to said means for generating a voltage analogue signal, whereby at resonance each AND gate is enabled to provide an output signal embodying a measure of the pertinent resonant frequency.

10. Apparatus according to claim 4 wherein each cavity is a cylindrical cavity operating in the $H_{012}$ mode to provide a wide dynamic frequency range.

11. Apparatus according to claim 4 wherein the microwave generator includes a backward wave oscillator to provide a wide dynamic range over the range of sweep frequency.

References Cited

UNITED STATES PATENTS

| | | |
|---|---|---|
| 2,421,933 | 6/1947 | Goldstine. |
| 2,580,968 | 1/1952 | Sproull. |
| 3,117,276 | 1/1964 | Beyer et al. |

RUDOLPH V. ROLINEC, Primary Examiner

M. J. LYNCH, Assistant Examiner